United States Patent [19]

Hosokawa et al.

[11] Patent Number: 5,132,960
[45] Date of Patent: Jul. 21, 1992

[54] INFORMATION RECORDING MEDIUM WITH CONCENTRIC SPACERS AND CUT-AWAY ADHESIVE

[75] Inventors: Tetsuo Hosokawa, Numazu; Yutaka Ueda, Yokohama, both of Japan

[73] Assignee: Ricoh Company, Ltd., Tokyo, Japan

[21] Appl. No.: 278,221

[22] Filed: Nov. 30, 1988

[30] Foreign Application Priority Data

Aug. 12, 1987 [JP] Japan .................. 62-311743

[51] Int. Cl.5 .......................... G11B 7/24; G11B 7/26
[52] U.S. Cl. .................... 369/284; 369/280; 369/286; 369/283; 430/495; 430/945
[58] Field of Search ............ 369/275, 280, 283, 286, 369/289, 291, 292, 272, 273, 274, 275, 276, 277, 278, 279, 282; 428/694, 65; 430/495, 945

[56] References Cited

U.S. PATENT DOCUMENTS

| 4,564,932 | 1/1986 | Lange | 156/308.4 X |
|---|---|---|---|
| 4,710,913 | 12/1987 | Matsushima et al. | 369/290 X |
| 4,720,826 | 1/1988 | Sugiyama et al. | 369/283 |
| 4,834,819 | 5/1989 | Todo et al. | 369/286 X |
| 4,892,606 | 1/1990 | Miyazaki et al. | 369/286 X |

FOREIGN PATENT DOCUMENTS

| 191308 | 3/1987 | Japan | 369/275 |
|---|---|---|---|
| 62-285248 | 12/1987 | Japan . | |
| 151547 | 1/1988 | Japan | 369/275 |
| 63-266648 | 2/1988 | Japan | 369/272 |
| 3195840 | 8/1988 | Japan | 369/284 |

*Primary Examiner*—Stuart S. Levy
*Assistant Examiner*—Joseph A. Rhoa
*Attorney, Agent, or Firm*—Cooper & Dunham

[57] ABSTRACT

An information recording medium of an air-sandwich sealed type is disclosed, which comprises a pair of disk-shaped substrate to form an inner space therebetween; an inner circumferential spacer and an outer circumferential spacer interposed between the pair of disk-shaped substrates; and a recording layer formed on the inner surface of at least one of the disk-shaped substrates, with an adhesive agent being applied to the surface of at least the inner circumferential spacer or the outer circumferential spacer in the form of a plurality of concentric adhesive layers, each of the concentric adhesive layers having at least one cut-away portion to which the adhesive agent is not applied to form a vent and an air passage between the surface of the inner circumferential space or the outer circumferential spacer and any of the substrates, the vent and the air passage capable of allowing the air to pass from the inner inner space formed by the disk-shaped substrates to the outside and vice versa, and the cut-away portions of the adhesive layers being shifted in position from each other.

3 Claims, 1 Drawing Sheet

FIG. I
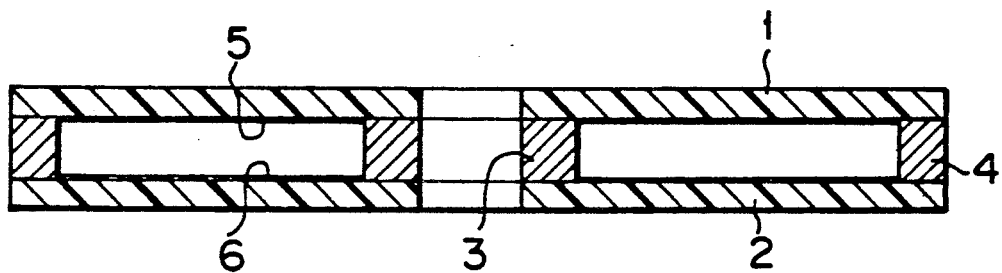
FIG. 2
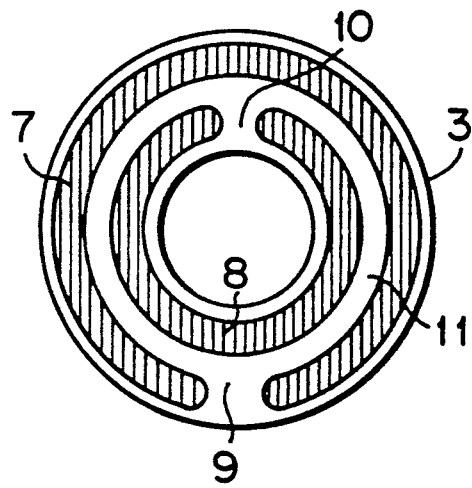
FIG. 3
PRIOR ART
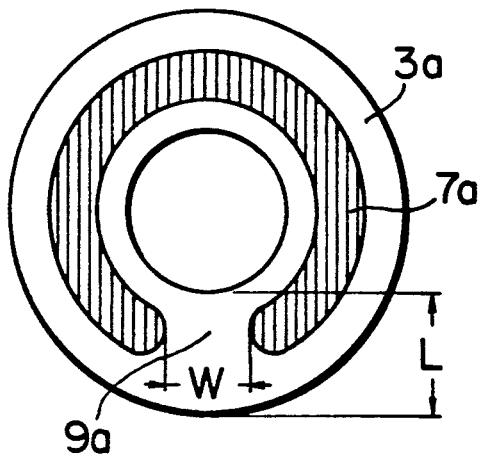
FIG. 4
PRIOR ART
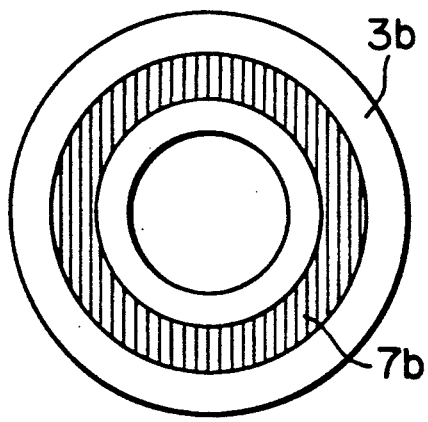

INFORMATION RECORDING MEDIUM WITH CONCENTRIC SPACERS AND CUT-AWAY ADHESIVE

BACKGROUND OF THE INVENTION

The present invention relates to an information recording medium of an air-sandwich sealed type which comprises a pair of disk-shaped substrates to form an inner space therebetween, a pair of inner and outer circumferential spacers interposed therebetween, and a recording layer deposited on the inner surface of at least one of the substrates.

A conventional information recording medium of an air-sandwich type comprises a pair of disk-shaped substrates made of a transparent rigid plate of a resin such as acrylic resin and polycarbonate resin, at least one of which carries on an inner side thereof a recording layer made of a thin metal layer of Te or the like, or an organic pigment layer of phthalocyanine or the like; an inner circumferential spacer 3a shown in FIGS. 3 or 3b shown in FIG. 4 and an outer circumferential spacer interposed therebetween, the inner circumferential spacer being placed at the central portion of the substrates and the outer circumferential spacer being placed at the outer circumference of the substrates. These members are sealed by an adhesive agent, whereby a sealed type recording medium is fabricated. When sticking the spacers to the substrates, the adhesive agent is applied to the spacer surfaces in the form of an adhesive layer 7b as shown by the hatching in FIG. 4. The thus fabricated recording medium is airtight, so that the disk-shaped substrates tend to be deformed to cause the inclination of the surface of the recording layer when there is a difference between the inner pressure of the recording disk and the atmospheric pressure. This readily occurs. Once such surface inclination takes place in the substrates, tracking distortion is brought about when reproducing recorded information from the recording medium.

In order to overcome such a drawback, it has been proposed to provide a vent in the disk-shaped substrates. However, such a vent makes the sealed type recording disk non-airtight, so that the recording layer formed on the inner surfaces of the recording disk readily deteriorates when directly exposed to some adverse materials contained in the air.

Recently, an attempt has been made that when an inner circumferential spacer is struck to a pair of the substrates by an adhesive agent applied in the form of an adhesive layer 7a, a portion to which no adhesive agent is applied is provided as indicated by reference numeral 9a in FIG. 3, which is hereinafter referred to as the cut-away portion. A small gap formed between the substrate and the spacer in the cut-away portion 9a serves as an air passage. However, the thus formed air passage has a length L, at maximum, equal to the width of the inner circumferential spacer as shown in FIG. 3. This length, however, is not sufficient for preventing the recording layer from being directly exposed to the air, so that it is inevitable that the recording layer is deteriorated by the adverse materials contained in the air.

Further, it is extremely difficult to properly adjust the width W of the cut-away portion 9a in actual production in such a manner that the flow rate of the air which may enter the inner space of the recording medium is controlled so as to avoid the above-mentioned problem as long as the length L of the air passage is limited as mentioned above.

SUMMARY OF THE INVENTION

It is therefore an object of the present invention to provide an improved information recording medium which comprises a pair of disk-shaped substrates to form an inner space therebetween, a pair of inner and outer circumferential spacers interposed therebetween, and a recording layer formed on the inner surface of at least one of the substrates, from which the above-mentioned shortcomings of the conventional information recording media are eliminated.

The above object of the present invention can be attained by applying a plurality of concentric adhesive layers to any of the inner circumferential spacers and/or the outer circumferential spacers so as to form an air passage 11, between any of the substrates and any of the inner and outer circumferential spacer, for allowing the air to pass therethrough in such a manner as to maximize the length of the passage as shown in FIG. 2. More specifically, each concentric adhesive layer 7 or 8 has at least one portion to which no adhesive agent is applied to form a cut-away portion 9, and an air passage 11 is formed between the adjacent concentric adhesive layers for allowing the air to pass between the inner space formed by the disk-shaped substrates and the outside air, and such cut-away portions are arranged so as to be shifted in position from each other, thereby maximizing the length of the air passage 11 and curving the air passage 11 so as to avoid direct flow of the air.

BRIEF DESCRIPTION OF THE DRAWINGS

In the drawings,

FIG. 1 is a schematic cross-sectional view of an information recoding medium of the present invention;

FIG. 2 is a plan view of an inner circumferential spacer for use in an information recording medium according to the present invention;

FIG. 3 is a plan view of a conventional inner circumferential spacer for use in a conventional information recording medium; and FIG. 4 is a plan view of another conventional inner circumferential spacer for use in a conventional information recording medium.

DETAILED DESCRIPTION AND PREFERRED EMBODIMENTS

The present invention will now be explained in more detail with reference to the accompanying drawings.

As shown in FIG. 1, an information recording medium of the present invention comprises a pair of disk-shaped substrates 1 and 2 to form an inner space therebetween, an inner circumferential spacer 3 which is interposed between the substrates 1 and 2 at the central portion thereof, and an outer circumferential spacer 4 which is interposed between the substrates 1 and 2 at the outer circumference thereof. On at least one of the inner surfaces of the disk-shaped substrates 1 and 2, an information recording layer 5 or 6 is provided. Further, on any of the surfaces of the inner circumferential spacer 3 and/or the outer circumferential spacer 4, a plurality of adhesive layers 7 and 8 is concentrically provided as shown in FIG. 2 so as to form at least one air passage 11 therebetween. Each concentric adhesive layer has at least one portion to which no adhesive agent is applied to form a cut-away portion as indicated by reference numerals 9 and 10. These cut-away portions serve to form a vent for the air and are arranged so as to be shifted in position from each other, thereby maximizing the length of the air passage 11. The spacers to which the adhesive agent is applied in the above manner are stuck to the substrates, whereby the information recording medium of the present invention is fabricated.

In the thus fabricated information recording medium of the present invention, the concentric adhesive layers 7 and 8 each have one cut-away portion, specifically the concentric adhesive layers 7 and 8 respectively have the cut-away portions 9 and 10, which are alternatively positioned in an opposite position to each other with respect to the center of the inner circumferential spacer 3 or of the outer circumferential spacer 4. In this configuration, it does not occur that the air directly enters the inner space of the recording medium since the air passage 11 is curved and relatively long as shown in FIG. 2, and it takes time for the air to enter the inner space of the recording medium, so that the adverse materials contained in the air are absorbed or adsorbed by the side walls of the air passage 11 during the passage of the air through the air passage 11, thus the recording layers 5 and 6 are protected from being exposed directly to the adverse materials contained in the air. Because of the thus controlled air flow into and from the inner space of the recording medium, sudden inclination of the surface of the recording layer 5 or 6 and deformation of the recording medium are completely avoided in the present invention.

The adhesive layers 7 and 8 may be provided between the inner circumferential spacer 3 and one of the disk-shaped substrates 1 and 2. The adhesive layers 7 and 8 may also be provided between the outer circumferential spacer 4 and one of the disk-shaped substrates 1 and 2.

As the substrates 1 and 2, any materials which are usable as a substrate of conventional recording disks can also be employed. For instance, plastics such as polyester, acrylic resin, polycarbonate, polyamide, polyolefine resin, phenolic resin, epoxy resin and polyimide, glass, ceramics and metals can be employed. On the surface of the substrates 1 and 2, pre-formats for address signal, and pre-grooves for guide grooves can be formed. The substrates 1 and 2 can be molded either by the photopolymer method or by the injection molding method.

As the recording layers 5 and 6, any recording layers applicable to the conventional recording disks can be employed. For instance, a recording layer comprising as the main component an organic dye, for example, a polymethine dye such as a cyanine dye, a merocyanine dye, a croconium dye and a pyrylium dye; and as an additional component phthalocyanine dyes, tetrahydrocholine dyes, dioxazine dyes, triphenothiazine dyes, triphenothiazine dyes, phenanthrene dyes, anthraquinone (Indanthrene) dyes, xanthene dyes, triphenylmethane dyes, azulene dyes and the like, can be employed.

Metals such as In, Sn, Te, Bi, Al, Se, Ag and Cu, and metal compounds such as $TeO_2$ and SnO can be dispersed in the recording layer or worked into a layer to form on the recording layer. Further, other polymeric materials, stabilizers for preservation (for example, metal complexes, and phenolic compounds), dispersing agents, agents for making incombustible, unguents, charging prevention agents, and plasticizers can be added to the recording layer.

The recording layers 5 and 6 can be formed on the substrate by any of the conventional methods such as vacuum evaporation, sputtering, chemical vapor deposition or solution coating. Of these, the solution coating method is most preferable for forming the recording layer.

As the spacers 3 and 4, any materials which are conventionally used as a spacer for air-sandwich sealed type recording media can be employed. In particular, ABS resin is one of the most preferable materials.

As the adhesive agent for use in the present invention, any adhesive agents which are conventionally used for fabricating air-sandwich sealed type recording media can be employed.

An undercoat layer may be formed between the recording layers 5 and 6 and the substrates 1 and 2 when necessary.

For instance, in order to improve the adhesiveness of the recording layer to the substrate, a variety of polymeric materials such as ionomer resin, polyamide resin, vinyl resin, natural polymeric material, silicone and liquid rubber, and silane coupling agent can be employed.

For the purposes of protecting the recording layer from water and gases, and improving the preservability and stability of the recording layer, inorganic compounds such as $SiO_2$, $MgF_2$, SiO, $TiO_2$, ZnO, TiN, and SiN, metals and metalloids such as Zn, Cu, S, Ni, Cr, Ge, Se, Au, Ag and Al, can be employed in addition to the above polymeric materials.

In order to improve the reflection ratio of the recording layer, metals such as Ag and Al, and dyes having metallic luster such as methine dye and xanthene dye can be employed.

With reference to the following example, the present invention will now be explained in more detail, which is given for illustration of the present invention and is not intended to be limiting thereof.

EXAMPLE 1

A pair of disk-shaped polymethyl methacrylate substrates having a diameter of 200 mm and a thickness of 1 mm were prepared. A pre-groove was formed in one of the substrates by the conventional photopolymer method.

A 1,2-dichloroethane solution of the following dye with a concentration thereof being 0.7 wt. % was coated on the substrate by spin coating at 600 rpm, so that a recording layer was formed thereon.

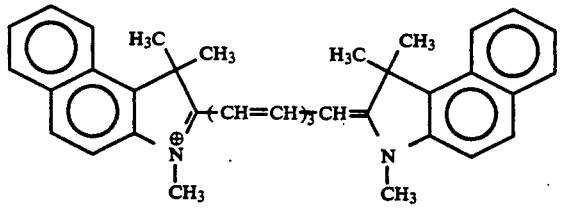

On an inner circumferential spacer, two adhesive layers were formed with a thickness of 1 mm as illustrated in FIG. 2 by use of an adhesive agent prepared in the following formulation:

In the formulation given below, A represents a moiety of $$CH_2=CHCO-$$
$$\parallel$$
$$O$$

| | Parts by weight |
|---|---|
| A—C(CH₃)HCH₂OCNHCH₂ [cyclohexane with C₂H₅, H, C₂H₅, C₂H₅ substituents] <br> $\parallel$ <br> O <br><br> A—C(CH₃)HCH₂OCNH <br> $\parallel$ <br> O | 60 |
| A$+$CH₂CH₂O$\)_{\overline{8}}$CH₂CH₂—A | 25 |
| A—CH₂CH₂CH₂CH₂CH₂COOCH₂—[cyclohexane with H, O] | 15 |
| 2,2-dimethoxy-2-phenylacetophenone (photopolymerization initiator) | 1 |

The above inner circumferential spacer was fixed to one of the above-mentioned substrate, and an inner circumferential spacer was also fixed to the other substrate by use of the same adhesive agent as used above in such a configuration as illustrated in FIG. 1, whereby an information recording medium according to the present invention was fabricated.

The above adhesive agent, which is of an ultraviolet curing type, was hardened by being exposed to ultraviolet light at an illuminance of about 30 mW/cm² for 30 seconds by use of a commercially available high pressured mercury lamp (Trademark "Rapid Cure 2000" made by Ushio Inc.).

The thus fabricated optical information recording medium of the present invention was subjected to a measurement of a recording layer surface inclining test at a pressure of 0.76 atm.

Further, the reflectivity of the recording layer of the recording medium was measured before and after the preservation in the presence of 100 ppm of NO₂ under a pressure of 1 atm or less for 10 days, so that the decreasing rate of the reflectivity was calculated. The results are shown in Table 1.

Comparative Example 1

Example 1 was repeated except that the inner circumferential spacer with the adhesive layers as shown in FIG. 2 employed in Example 1 was replaced by an inner circumferential spacer with an adhesive layer in the form as illustrated in FIG. 3, whereby a comparative information recording medium No. 1 was fabricated.

The thus fabricated comparative information recording medium No. 1 was evaluated with respect to the recording layer surface inclination and the decreasing rate of the reflectivity thereof in the same manner as in Example 1. The results are shown in Table 1.

Comparative Example 2

Example 1 was repeated except that the inner circumferential spacer with the adhesive layers as shown in FIG. 2 employed in Example 1 was replaced by an inner circumferential spacer with an adhesive layer in the form as illustrated in FIG. 4, whereby a comparative information recording medium No. 2 was fabricated.

The thus fabricated comparative information recording medium No. 2 was evaluated with respect to the recording layer surface inclination and the decreasing rate of the reflectivity thereof in the same manner as in Example 1. The results are shown in Table 1.

TABLE 1

| Examples of Recording Medium | Recording Layer Surface Inclination (min) | Decreasing Rate of Reflectivity (%) |
|---|---|---|
| Example 1 | 0 | 2 |
| Comparative Example 1 | 0 | 5 |
| Comparative Example 2 | 22.7 | 0 |

The data in the above table indicate that, in the information recording medium of the present invention, the inclination of the recording layer was not observed at all, and the decreasing rate of the reflectivity was much smaller than that of the comparative information recording medium No. 1 which has a conventional spacer with a single adhesive layer as shown in FIG. 3. The comparative information recording medium No. 2 having another conventional with a single adhesive layer without a cut-away portion as shown in FIG. 2 cannot be used in practice in view of the inclination of the surface of the recording layer.

What is claimed is:

1. An information recording medium of an air-sandwich sealed type comprising:
   (a) a pair of disk-shaped substrates disposed to define an inner space between them, each of said substrates having an inner surface;
   (b) an inner circumferential spacer and an outer circumferential spacer interposed, in spaced-apart relation to each other, between said pair of disk-shaped substrates, each of said spacers having opposed surfaces respectively facing the inner surfaces of said substrates;
   (c) a recording layer formed on the inner surface of at least one of said disk-shaped substrates within said inner space and between the inner and outer circumferential spacers; and
   (d) an adhesive agent applied to said opposed surfaces of said inner circumferential spacer and said outer circumferential spacer,
   (e) said adhesive agent applied to one of said opposed surfaces of said inner circumferential spacer being in the form of a plurality of spaced-apart concentric adhesive layers each having at least one cut-away portion to which said adhesive agent is not applied to form a vent and an air passage between said inner circumferential spacer and the substrate inner surface facing said one opposed surface of said inner circumferential spacer, for allowing air to pass from said inner space to the outside and vice versa, said cut-away portions of said concentric adhesive layers being shifted in position from each other such that the length of the path traversed by air in said passage between said inner space and the outside is substantially greater than the radial distance through said concentric adhesive layers between said inner space and the outside, and
   (f) said cut-away portions being alternatively positioned in an opposite position to each other with respect to the center of said inner circumferential spacer.

2. The information recording medium as claimed in claim 1, wherein said concentric adhesive layers each have only one cut-away portion.

3. The information recording medium as claimed in claim 1, further comprising an undercoat layer between the inner surface of any of said substrates and said recording layer.

* * * * *